UNITED STATES PATENT OFFICE.

HENRY NOEL POTTER, OF NEW ROCHELLE, NEW YORK, ASSIGNOR TO GEO. WESTINGHOUSE, OF PITTSBURG, PENNSYLVANIA.

METHOD OF PRODUCING SILICON MONOXID.

No. 875,675.  Specification of Letters Patent.  Patented Dec. 31, 1907.

Application filed June 10, 1905. Serial No. 264,553.

*To all whom it may concern:*

Be it known that I, HENRY NOEL POTTER, a citizen of the United States, and resident of New Rochelle, county of Westchester, State of New York, have invented certain new and useful Improvements in Methods of Producing Silicon Monoxid, of which the following is a specification.

I have invented a novel method of making silicon monoxid. This method may be expressed $$SiO_2 + Si = 2SiO.$$

It is noteworthy in view of the fact that here silica is reduced by silicon so that the whole reacting mass is converted into monoxid. There is no CO gas liberated, which renders it possible to conduct this reaction more easily at very low gas pressures than other reactions where not only SiO, but also CO is a product.

The absence of carbon renders it impossible to produce SiC, which I have sometimes found in small quantities as an impurity in silicon monoxid powder. Silicon carbid is a particularly undesirable impurity as it cannot be removed by the action of any reagent which does not attack silicon monoxid, whereas many other impurities such as magnesia, alumina and calcium oxid, can be largely removed, and iron to a somewhat lesser degree, due perhaps to its presence as $FeSi_2$ which resists reagents to a marked degree.

In practicing my invention, I may use any adequate method of heating, but I have most frequently made a mixture of granular silicon, 28 parts, and granular silica, 60 parts, and charged them about the resistor of a vacuum electric furnace such, for example as is described in my application No. 166,667 filed July 23, 1903 or in a vacuum electric furnace of the arc type. After pumping the air out of the furnace, the reaction is instituted and continued for a suitable length of time depending upon the style and size of furnace.

It is not necessary to have accurately the correct reactive proportions of silicon and silica, as an excess of either ingredient can only either remain behind or be volatilized and found as an impurity in the silicon monoxid. For certain purposes it is desirable to avoid the presence of silicon dioxid in the product and in such cases I may use in the furnace a charge having a slight excess of silicon. Even large excess of either ingredient of the charge will not prevent the product being mostly silicon monoxid, but large excess is not desirable as the yield per kilowatt hour is reduced.

I claim as my invention:—

1. The method of producing silicon monoxid which consists in reducing silica by means of silicon.

2. The method of producing silicon monoxid by causing a reaction between silica and silicon.

3. The method of producing silicon monoxid by heating a mixture of granular silicon and granular silica.

4. The method of producing silicon monoxid by heating a mixture of silicon and silicon dioxid under reduced pressure.

5. The method of producing silicon monoxid by promoting the reaction, silicon dioxid plus silicon = 2 silicon monoxid, in an indifferent atmosphere, preferably under reduced pressure.

6. The method of producing silicon monoxid which consists in mixing granular silicon and crushed quartz and submitting said mixture to an intense heat.

Signed at New York, in the county of New York, and State of New York, this 7th day of June A. D. 1905.

HENRY NOEL POTTER.

Witnesses:
WM. H. CAPEL,
GEORGE H. STOCKBRIDGE.